United States Patent Office 3,307,959
Patented Mar. 7, 1967

3,307,959
CLAY STRUCTURES
Ronald H. Cooper, Clare, Mich., assignor to The Dow Chemical Company, Midland, Mich., a corporation of Delaware
No Drawing. Filed Aug. 18, 1965, Ser. No. 480,749
7 Claims. (Cl. 106—67)

This invention relates to improved clay compositions and to a method for preparing such compositions. More particularly it is concerned with improved clay compositions which are heat curable stabilized clay structures exhibiting water resistance.

Clay structures prepared according to the known art are formed or extruded from wet clay as a plastic mass. Once formed into the desired shape, such structures are allowed to air dry and then are fired at appropriate temperatures. This treatment requires many hours and sometimes days for completion. If firing or heat treating of the clay is not done at an extremely high temperature the molded structure will disintegrate in the presence of water. Such structures are therefore useless for applications which require contact with water.

It is an object of this invention to provide an improved clay composition useful in producing improved clay structures. It is a further object of this invention to provide a process for the production of such improved clay structures. A still further object of this invention is to provide a process for the rapid production of clay structures which are water resistant and which may be heated to produce a ceramic state with little or no cracking and a minimum of shrinkage. These and other objects and advantages of the process will be readily appreciated and better understood by reference to the following detailed description.

It has now been discovered that a composition comprising clay, a monoasaccharide source material, an alkali metal hydrogen sulfate and water in the proper proportions, formed or molded to any desired shape, dried at an elevated temperature not substantially in excess of the boiling point of water and heat cured, provides a solid, rigid structure which may be prepared rapidly with little or no shrinkage or surface cracking and which is stable in the presence of water. Such structure may be heated further to produce ceramic structures in a fraction of the time previously required and yet retain their size and shape with little or no cracking.

A wide variety of clays are useful in the practice of this invention and includes Kaolin clays, Illitic clays, Bentonitic clays and the like. In general any commercial clay which is plastic when wet and will harden when fired is suitable for use herein.

The binder used to improve such clay compositions according to the instant invention is a polymeric composition resulting from the action of an acidic polymerization promoter of monosaccharide source material, preferably empolying an alkali metal hydrogen sulfate as the acidic promoter. As monosaccharide source material, a monosaccharide sugar, such as glucose or fructose for example, may be used directly or monosaccharides may be produced in situ by hydrolysis of the readily obtainable and inexpensive di- or polysaccharide hexos sugars as are present in cane sugar, beet sugar, molasses, and corn sugar. This hydrolysis results by utilizing the same acidic material as a hydrolyzer which subsequently, at moderately elevated curing temperatures, acts to promote polymerization of the monosaccharide source material.

As acidic salts to promote the hydrolysis and polymerization of the monosaccharides employed herein, any of the known acidic polymerization agents for monosaccharides may be employed. However, it is preferred to use the alkali metal hydrogen sulfates and the alkali metal monosubstituted ortho phosphate which are nonvolatile at the elevated curing temperatures, which do not decompose in the temperature range employed and which are solids that are molten at the curing temperature. Particularly useful materials are the alkali metal hydrogen sulfates, i.e. sodium bisulfate ($NaHSO_4$), potassium bisulfate ($KHSO_4$) and lithium bisulfate ($LiHSO_4$). Sodium bisulfate ($NaHSO_4$), because of its ready availability, low cost end effectiveness as a hydrolyzer and polymerizing promoter, has been found to be particularly useful in the present polymer or resin forming system. The amount of said acid material to be used will vary depending upon the total amounts and types of saccharide sugars present. Highly satisfactory polymeric binders result wherein the ratio of acidic promoter to saccharide varies from about 1 to 2 to about 2 to 1. Further, by employing an acid to saccharide ratio within the range just given, a reduction in curing time is realized. Lower amounts of acidic polymerization promoter are employed advantageously when monosaccharides are used directly in the composition. Preferably the amount of acid will be about the same as the amount of sugar used, for example, in a clay composition using from about 3 to 5 weight percent sucrose a corresponding amount of from about 3 to about 5 weight percent $NaHSO_4$ was used as hydrolyzing and monosaccharide polymerizing agent.

Relatively low boiling aqueous solutions of acids that possess relatively large ionization constant (i.e. larger than about $1 \times 10^{-5}$) such as hydrochloric, dilute nitric, dilute sulfuric, and the like generally are not useful in the present compositions as hydrolyzers and polymerization promoters. Some such compounds decompose and some are volatile at the curing temperature employed and therefore they do not remain in contact with the mixed components for a sifficiently long period to give the needed hydrolysis of polysaccharides and subsequent acid promoted polymerization of the resulting monosaccharides into the thermoset binder. Likewise, ammonium sulfate, ammonium persulfate, ammonium sulfamate, ammonium acid sulfate, zinc chloride, phosphoric acid, pyrophosphoric acid, monoammonium phosphate and the like are not suitable for use in the present process and composition as all these produce a corresponding volatile acid at curing temperatures.

The ratio between the weight of clay and weight of sucrose employed to produce the improved products of this invention will vary to some extent depending upon the characteristics of the clay employed. In some instances, as little as 1½ weight percent of monosaccharides based in the dry weight of clay may be employed. However, less than 3 weight percent monosaccharide generally produces a weak clay structure. Quantities of monosaccharides in excess of 15 percent by weight based on the dry weight of clay produces structures which lose their shape in the initial firing operation. It is preferred, therefore, to employ from about 3 to about 5 percent by weight of monosaccharide based on the clay employed.

The clay used herein is usually employed in admixture with water. The amount of water needed will depend upon the characteristics of the particular clay employed but the water content should be maintained as low as possible, particularly where pressing of the clay mixtures will be required to form the desired shape. Usually water contents of from 10 to 25 weight percent of the clay are suitable and from 17 to 20 percent by weight of water is usually preferred but preferred moisture contents are usually dependent on clay type.

Mixing of the components of this composition may be carried out in any suitable manner. For example, the monosaccharide and acid curing agent may be added to a predetermined quantity of water to form a solution and dry powdered clay may be added thereto with mixing until a homogeneous mass is produced. Likewise, the monosaccharide and acid curing agent may be added to a water-containing plastic mass of clay, e.g. such as occurs in nature with suitable mixing to assure uniform products. Once uniformly mixed, the clay composition may be fabricated into any desired shape by molding, extruding and the like. The formed composition is then dried at an elevated temperature, preferably not substantially in excess of the boiling point of water, for a period of time sufficient to remove a major portion of the water therefrom. Preferably the drying is conducted at or near 212° F. Once substantially free of uncombined water, the formed product is heat cured at a temperature of from about 300 to about 400° F. for a period of time from about 30 minutes to about 4 hours. The time of cure varies directly both with the temperature of cure and the thickness and/or size of the body being cured. If desired, the cured clay composition may then be fired at 2000° F. or more to produce a ceramic article.

The clay structures prepared by curing the clay composition at intermediate temperatures of 300 to 400° F. produce a structure with no indication of shrinkage, little or no surface cracks. Such devices are strong and unaffected by water. These structures are suitable for use as outdoor roofing or conduit tiles or may be used as stabilized road subsurface material as well as use in pottery and the like. If such structures are heated sufficiently to produce ceramics, the ceramic product is strong and contains little or no surface cracking.

In order to provide ease in understanding, the following examples are set forth to illustrate the invention but are not to be construed to limit the scope thereof.

*Example 1.—Comparative (i.e. outside the scope of the invention)*

A 150 gram sample of Kaolin R clay was mixed with 20 grams of water in a mix-muller for six minutes. From this clay mixture a specimen was extruded which was 3 inches long, 1 inch wide and ¼ inch thick. The specimen was heated to 385° F. for 45 minutes and at the end of this period examination showed the product to contain surface cracks. Upon immersion in water the specimen disintegrated.

A second specimen prepared in the same fashion was additionally fired at 980° F. for 16 hours. After firing the specimen was very weak and distinguished upon handling.

*Example 2.—Comparative*

A clay specimen was prepared according to the procedure of Example 1 except that 5 percent by weight based on the clay content of sucrose was added to the formulation. The specimen was heated to 385° F. for 45 minutes. At the end of the heating period a product contained surface cracks and disintegrated in water.

A second specimen prepared in the same way was fired at 980° F. for 16 hours. The specimen was very fragile and disintegrated upon handling.

An additional specimen was prepared in a like manner except that such specimen was heated first to 212° F. for 60 minutes, then heated to 385° F. for 45 minutes. The specimen likewise evidenced surface cracks and disintegrated in water. Upon heating of a like specimen to 980° F. for 16 hours the product produced was very weak and disintegrated upon handling.

*Example 3*

In a similar manner to Examples 1 and 2, 150 gram samples of Kaolin R clay were added to 30 grams of water containing various quantities of sucrose and sodium bisulfate as indicated in the table below. The components were admixed in a mix-muller for 6 minutes and specimens were extruded which were 3 inches long and ¼ inch in diameter. The resulting specimens were dried at 212° F. and then cured at 385° F. Some samples were then fired at higher temperatures. The results obtained with these specimens are shown in the following table.

TABLE I

| Composition, Wt. Percent Based on Clay | | $H_2O$ | Conditions | | | Fired at 980° F., 16 hours | Fired at 1,160° F., 16 hours | Fired at 2,012° F. for 4 hours | | |
|---|---|---|---|---|---|---|---|---|---|---|
| Sucrose | NaHSO$_4$ | | Drying Time (minutes) | Curing Time (minutes) | Remarks | Remarks | Remarks | Tensile Strength (p.s.i.) | Percent Shrinkage | Remarks |
| 3.0 | 3.0 | 20.0 | 60 | 45 | Strong; no surface cracks; stable in water; no shrinkage. | Strong; no surface cracks; stable in water; no shrinkage. | Very strong; no surface cracks; stable in water; no shrinkage. | 94 | 2.13 | Strong; no surface cracks; stable in water. |
| 5.0 | 5.0 | 20.0 | 120 | 45 | ----do---- | Very strong; no surface cracks; stable in water; no shrinkage. | ---------- | 167 | 8.67 | Very strong; few surface cracks; stable in water. |
| 15.0 | 15.0 | 20.0 | 120 | 60 | Very strong and hard; no surface cracks; stable in water; no shrinkage. | ---------- | ---------- | 116 | 19.20 | Very strong; some surface cracks; stable in water. |

Various modifications can be made in the present invention without departing from the spirit or scope thereof for it is understood that I limit myself only as defined in the appended claims.

I claim:

1. A curable clay composition consisting essentially of clay containing from 17 to 20 weight percent water, from 3 to 5 weight percent of a monosaccharide and from 3 to 5 weight percent of an alkali metal hydrogen sulfate wherein the weight ratio of monosaccharide to alkali metal hydrogen sulfate is from 1:2 to 2:1.

2. The composition of claim 1 wherein the alkali metal acid sulfate is selected from the group consisting of NaHSO$_4$, KHSO$_4$ and LiHSO$_4$.

3. A curable clay composition consisting essentially of kaolin clay containing from 17 to 20 weight percent water, from 3 to 5 weight percent sucrose and from 3 to 5 weight percent NaHSO$_4$ wherein the weight ratio of sucrose to NaHSO$_4$ is about 1:1.

4. A process for the rapid production of a stabilized clay structure which comprises
    (1) admixing clay with from 10 to 25 weight percent water, 1.5 to 15 weight percent of a monosaccharide and from 1.5 to 15 weight percent of an alkali metal hydrogen sulfate wherein the weight ratio of the monosaccharide to the alkali metal hydrogen sulfate is from 2:1 to 1:2, (2) drying such mixture at an elevated temperature not substantially in excess of the boiling point of water, and,
(3) curing said dried mixture at a temperature of 300 to 400° F.

5. A process for the production of a stabilized clay structure which comprises
(1) admixing clay with from about 17 to 20 weight percent water, from 3 to 5 weight percent of a monosaccharide, from 3 to 5 weight percent of an alkali metal hydrogen sulfate selected from the group consisting of $NaHSO_4$, $KHSO_4$ and $LiHSO_4$ wherein the weight ratio of monosaccharide to alkali metal hydrogen sulfate is from 2:1 to 1:2,
(2) forming said mixture into a shape,
(3) drying said formed shape at about 212° F., and
(4) curing said dried formed shape at a temperature of from about 300 to 400° F. for a period of time of from 30 minutes to 4 hours.

6. A process for the production of a stabilized clay structure which comprises
(1) admixing kaolin clay with from about 17 to 20 weight percent water, from 3 to 5 weight percent sucrose and from 3 to 5 weight percent $NaHSO_4$ wherein the weight ratio of sucrose to $NaHSO_4$ is about 1:1,
(2) forming said mixture into a shape,
(3) drying said formed shape at about 212° F., and
(4) curing said dried formed shape at a temperature of from about 300 to 400° F. for a period of time from 30 minutes to 4 hours.

7. A process for the production of a stabilized ceramic structure which comprises
(1) admixing kaolin clay with from about 17 to 20 weight percent water, from 3 to 5 weight percent sucrose and from 3 to 5 weight percent $NaHSO_4$ wherein the weight ratio of sucrose to $NaHSO_4$ is about 1:1,
(2) forming said mixture into a shape,
(3) drying said formed shape at about 212° F.,
(4) curing said dried formed shape at a temperature of from about 300 to 400° F. for a period of time from 30 minutes to 4 hours, and
(5) additionally curing said dried formed shape at a temperature of about 2,012° F. for a period of time sufficient to produce a ceramic structure.

References Cited by the Examiner
UNITED STATES PATENTS

| | | | |
|---|---|---|---|
| 2,480,577 | 8/1949 | Hertzell et al. | 106—67 |
| 2,965,504 | 12/1960 | Gogek | 106—71 |

TOBIAS E. LEVOW, *Primary Examiner.*
HELEN M. McCARTHY, J. E. POER,
*Assistant Examiners.*